United States Patent [19]

Dian et al.

[11] 3,871,710

[45] Mar. 18, 1975

[54] WIDE FLANGE BICYCLE HUB

[75] Inventors: Walter Dian, Downers Grove; Charles V. Wrobel, Rolling Meadows, both of Ill.

[73] Assignee: Beatrice Foods Company, Elgin, Ill.

[22] Filed: Dec. 10, 1973

[21] Appl. No.: 423,315

[52] U.S. Cl. ............................. 301/105 B, 308/192
[51] Int. Cl. ............................................. B60b 27/02
[58] Field of Search ............ 301/105 R, 105 B, 111, 301/125; 308/192

[56] References Cited
UNITED STATES PATENTS

| | | | |
|---|---|---|---|
| 3,131,008 | 4/1964 | Dian | 301/105 B |
| 3,428,377 | 2/1969 | Christian | 308/192 |

*Primary Examiner*—Lloyd L. King
*Assistant Examiner*—Reinhard J. Eisenzopf
*Attorney, Agent, or Firm*—Hill, Gross, Simpson, Van Santen, Steadman, Chiara & Simpson

[57] ABSTRACT

Bicycle hub assembly giving maximum spacing between bearings for the hub and positioning the spokes to clear the tines of the bicycle fork, to provide the wide spacing desirable with the present-day bicycle and improve stability and reduce wheel bearing wear. This is attained by providing large diameter spoke attachment flanges at opposite ends of the hub flaring inwardly over the bearings to position the points of attachment of the spokes to the flanges over the bearings and provide ample clearance of the spokes from the tines of the bicycle fork.

8 Claims, 3 Drawing Figures

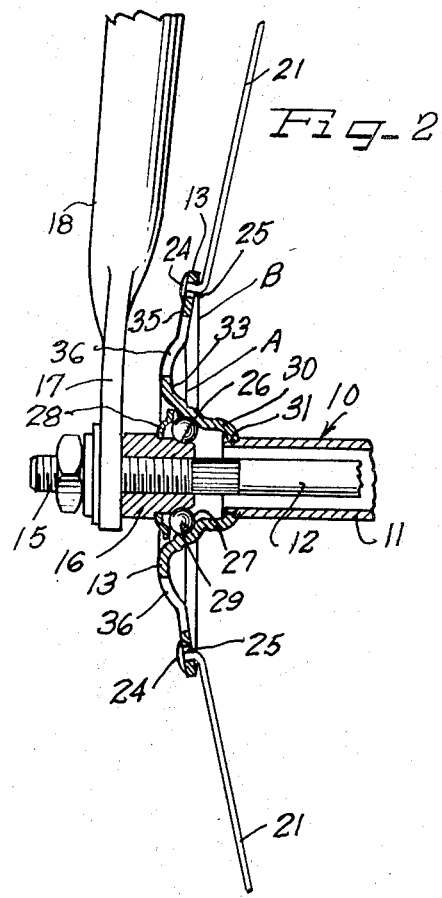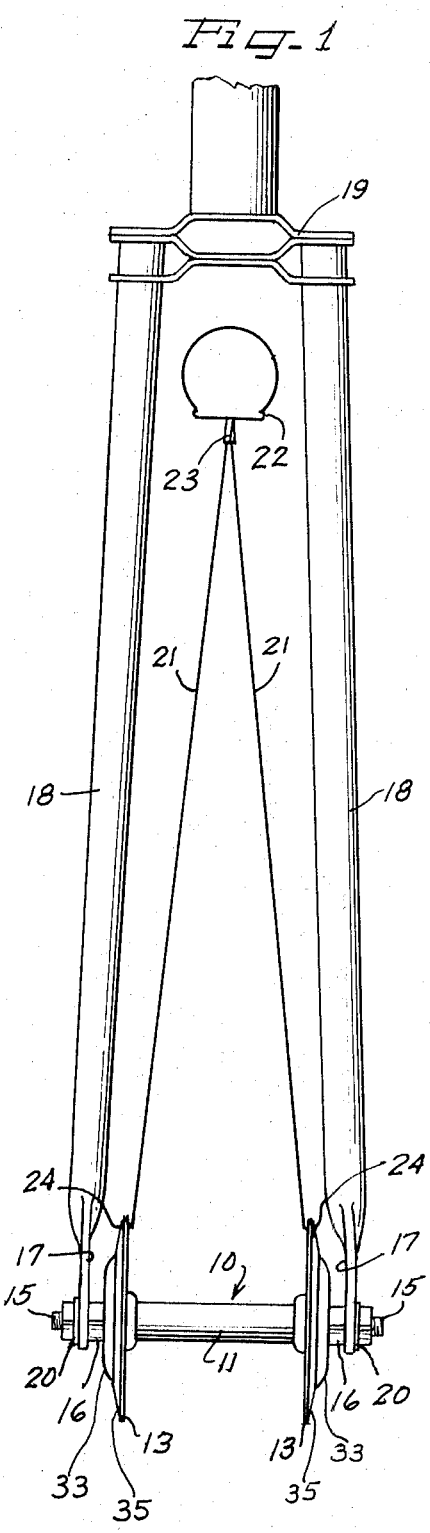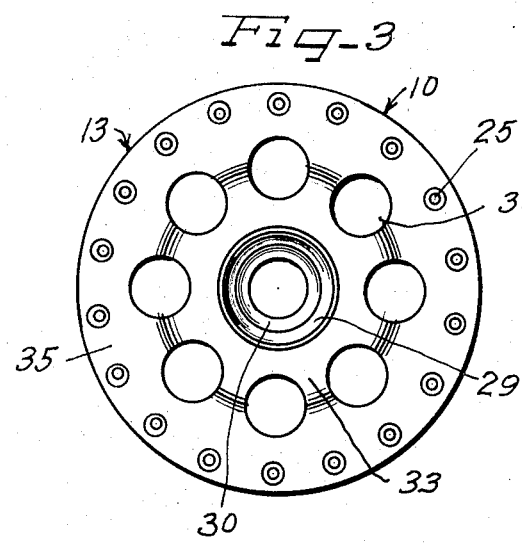

3,871,710

WIDE FLANGE BICYCLE HUB

FIELD OF THE INVENTION

Wide flange bicycle hub and bearing support therefor.

BACKGROUND AND ADVANTAGES OF INVENTION

The spoke attachment flanges of bicycle hubs have heretofore extended perpendicular to the shaft for the hub and have been spaced a substantial distance outwardly of the bearings for the hub. An example of such a hub is shown in U.S. Pat. No. 3,131,008, which issued to Walter Dian on Apr. 28, 1964.

In present-day bicycles, the spaces between the tines of the bicycle fork have been widened to add to the stability of the hub and wheel, and the spoke attachment flanges have extended perpendicular to the hub axis, substantially limiting the diameter of the flanges and the spacing between the bearings with the result that the bearings for said hub are undesirably relatively closely spaced, with spacers spacing the bearing cones from the tines of the bicycle fork.

The wide spacing of the bicycle fork tines has created a demand for large diameter flanges. With such flanges, in order for the spokes to provide safe clearance between the tines of the bicycle fork, where attached to the flanges, the flanges and hub bearings have been spaced inwardly of the tines of the fork, with the result that the bearing spacing is no more than in previous bicycle hubs and spacers are required to space the bearing cones from the tines of the bicycle hub.

By the present invention, we avoid the disadvantages of prior bicycle hubs by recessing the bearings for the hub within the vertical limits of the attachment of the spokes to the flanges and attain maximum spacing between the bearings and clearance between bicycle spokes and tines for the bicycle hub and eliminate the spacers heretofore required to space the bearings from the bicycle hub.

An advantage of the invention, therefore, is in the ability to provide hubs having relatively large diameter flanges extending from the hub for the bicycle wheel and to avoid the spacers heretofore necessary to clear the spokes from the tines of the bicycle fork.

A further advantage of the invention is the provision of a bicycle hub having relatively large diameter flanges and constructed to attain maximum spacing between the bearings for fork width and to, therefore, attain more stability and less wear on the bearings.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a front view of a bicycle fork diagrammatically illustrating the wheel and spokes and illustrating a large diameter wide flange bicycle hub constructed in accordance with the principles of the present invention.

FIG. 2 is a cross sectional view taken through the bicycle hub; and

FIG. 3 is an end view of a flange shown in FIGS. 1 and 2.

DESCRIPTION OF PREFERRED EMBODIMENT OF INVENTION

In the drawings, we have shown a bicycle hub assembly 10 including a sleeve 11 concentrically journalled on a shaft 12 for rotation thereabout. Flanges 13 are spaced radially and outwardly of each end of said sleeve.

The shaft 12 is threaded at each end, as indicated by reference numeral 15, and has external cones 16 threaded thereon abutting flattened hub attachment portions 17 of tines 18 of a bicycle fork 19.

The fork 19 is of a conventional construction of a type having relatively widely spaced tines 18 in which the flattened portions 17 of the tines are slotted or drilled to receive the shaft 12. Nuts and washers 20 at each end of the shaft 12 abut the outsides of the flattened hub attachment portions 17 for holding the flattened portions 17 of the tines in abutment with the cones 16 and thereby holding the hub to the bicycle fork and mounting the bicycle wheel on the fork between the tines thereof.

The bicycle wheel is of a conventional construction having spokes 21 extending from a rim 22 of the wheel and connected thereto, as by adjustable threaded couplings 22, adjustable to adjust the spokes to the required tension, as is conventional with bicycle wheels, so need not herein be described further, except to point out that the spokes are outwardly bent at their inner ends and have heads 24 on the ends of the outwardly bent portions, to retain the ends of the spokes to apertured portions 25 of the hub flanges in a customary manner.

The cones 16 have external races 26 for balls 27 seated between said external races 26 and internal races 29 formed in bellshaped portions 30, i.e. internal cones of the flanges 13 and serving to provide bearings to rotatably mount the hub 10 on the shaft 12 in a conventional manner.

Each cone 16 also has a grease retainer and dust seal 28 mounted thereon having close clearance with the outside of the bellshaped portion 30 of the flange 13, to hold grease to the bearing balls and to prevent dust and sand from getting into the balls.

Referring now in particular to the flange 13 and certain novel features of the invention, said flange is shown as being formed integrally with the bell-shaped, internal cone portion 30. The axially inner end of the bell-shaped portion 30 is pressed into engagement with a groove 31 extending about the outer end of the sleeve 11 for the hub, and suitably secured thereto.

The bell-shaped portion 30 is shown as axially outwardly flared to position its inner race 29 within the limits of the flange 13. The flange 13, as shown, extends axially outwardly of the bell-shaped portion 30 and toward the tines 18, as indicated by reference numeral 33, outside of the balls 27 of the bearing, and is then flared radially outwardly and axially inwardly along bend line A in a relatively flat bell-shaped form, as indicated by reference numeral 35. When the axially inwardly flared portion 33 reaches its bend line A, shown as being in substantial radially alignment with the centers of the balls 27, the angle thereof is flattened to its periphery B to position the flange at its periphery between lines A and B, all of which, when radially inwardly extended, are substantially within the limits of the balls 27. Spaced air circulation apertured portions 36 may be circumferentially spaced along the flange with their centers substantially along the bend line between the portions 33 and 35 of the flange.

The structure just described makes it possible to place the bearing within the limits of the flange and still clear the flange and spokes from the tines of the bicycle fork. It further avoids the necessity of providing spacers between the tines of the forks and cones and enables the bearings for the hub to be widely spaced a maximum distance between the tines of the fork, giving more stability and less wear on the bearings.

We claim as our invention:

1. In a bicycle hub assembly and in combination with a wheel and fork of a bicycle having relatively widely spaced tines:
   a shaft having threaded opposite ends mounting the hub and wheel on the bicycle fork;
   respective external cones threaded on said opposite ends of the shaft;
   a sleeve coaxial with and radially spaced from said shaft;
   means for mounting said sleeve for rotation about said shaft comprising spoke attachment flanges fixedly secured to opposite ends of said sleeve and having bell-shaped generally axially outwardly flaring internal cones cooperating rotatably with said external cones through ball bearings between said cones; and
   wide generally radial flange portions extending from the axially outer end of said internal cones and flaring generally axially inwardly over at least a portion of said internal cones and positioning the peripheries of said flange portions within the extended limits of said ball bearings; said flange portions having means adjacent their perimeters to which wheel spokes are attached and the flange portions and the spokes being clear from the tines of the bicycle fork.

2. The bicycle hub assembly of claim 1, wherein said flange portions are of a modified bell-shaped form and have a series of spoke receiving apertures circumferentially spaced about said flanges close to the peripheries thereof, and positioning the spokes free from the tines of the bicycle fork and the spoke loads directly over said bearings.

3. The bicycle hub assembly of claim 2, wherein the flange portions are formed integrally with the internal cones and provide maximum spacing between the bearings for fork width, increasing the stability of the wheel and reducing wear on the bearings.

4. The bicycle hub assembly of claim 3, wherein the flange portions are each of an axially inwardly dished bell-shaped form having a relatively deep portion extending radially outwardly of said internal cones and axially inwardly to the region of said internal cones and a flattened portion extending radially outwardly of said deep-dished portion and terminating to position the peripheries of said flange portions in substantially vertical alignment with said internal cones and bearings.

5. The bicycle hub of claim 2, wherein circumferentially spaced air circulating apertures extend through the flange portions and are centered at the junctures of the flattened portions with the deep portions, and in addition to accommodating the circulation of air through the hub, accomodating ready forming of the flanges and reducing the weight thereof.

6. In a bicycle hub and wheel assembly and in combination with a bicycle fork having widely spaced tines forming a mounting for the hub,
   a wheel rim and spokes secured thereto and extending therefrom,
   a shaft mounted on the tines of said fork and forming a support for said hub and bearings mounting said hub on said shaft, and
   means providing maximum spacing between said bearings to increase the stability of the wheel and reduce wear on said bearings, comprising relatively large diameter spoke attachment flanges extending radially of said hub and having spoke attachment apertures extending therethrough and circumferentially spaced adjacent the peripheries thereof, said flanges being dished axially inwardly generally radially aligned over said bearings to position the spokes to clear the tines of the fork and accommodate the positioning of said bearings closely adjacent the tines of the fork.

7. The bicycle hub of claim 6, wherein the flanges have internal bearing races formed integrally therewith and are of a generally bell-shaped form extending radially over said bearings and dished generally axially inwardly and positioning the spokes at the point of attachment to said flanges over the bearings of the bicycle wheel.

8. The bicycle hub assembly of claim 7, wherein the flanges have steep and flat generally bell-shaped contours positioning the bearings relatively close to the tines of said forks and thereby obtaining maximum spacing between the bearings for fork width giving more stability and less wear on the bearings.

* * * * *

UNITED STATES PATENT OFFICE
CERTIFICATE OF CORRECTION

Patent No. 3,871,710      Dated March 18, 1975

Inventor(s) Walter Dian and Charles V. Wrobel

It is certified that error appears in the above-identified patent and that said Letters Patent are hereby corrected as shown below:

Column 2, line 28, change "22" to --23--.

Signed and Sealed this twenty-second Day of July 1975

[SEAL]

Attest:

RUTH C. MASON
*Attesting Officer*

C. MARSHALL DANN
*Commissioner of Patents and Trademarks*